United States Patent

Gadkaree

[11] Patent Number: 5,820,967
[45] Date of Patent: Oct. 13, 1998

[54] EXTRUDED STRUCTURES FROM THERMOSETTING RESINS

[75] Inventor: Kishor P. Gadkaree, Big Flats, N.Y.

[73] Assignee: Corning Incorporated, Corning, N.Y.

[21] Appl. No.: 650,685

[22] Filed: May 20, 1996

Related U.S. Application Data

[63] Continuation-in-part of Ser. No. 395,224, Feb. 27, 1995, abandoned.

[51] Int. Cl.$^6$ .................................................. B32B 3/12
[52] U.S. Cl. ................ 428/116; 264/29.1; 264/176.1; 264/177.12; 428/118
[58] Field of Search .................... 428/116, 118; 264/29.1, 176.1, 177.12

[56] References Cited

U.S. PATENT DOCUMENTS

| | | | |
|---|---|---|---|
| 4,061,807 | 12/1977 | Shaler et al. | 428/36.4 |
| 4,399,052 | 8/1983 | Sugino | 428/116 X |
| 5,389,325 | 2/1995 | Bookbinder et al. | 428/116 X |
| 5,451,444 | 9/1995 | DeLiso et al. | 428/116 |
| 5,510,063 | 4/1996 | Gadkaree et al. | 264/29.7 |

FOREIGN PATENT DOCUMENTS

| | | |
|---|---|---|
| 0 492 081 A1 | 7/1992 | European Pat. Off. . |
| 0 599 690 A1 | 6/1994 | European Pat. Off. . |
| 56-022617 | 3/1981 | Japan . |
| 57-027130 | 2/1982 | Japan . |
| 3271151 | 12/1991 | Japan . |
| 5000242 | 1/1993 | Japan . |

OTHER PUBLICATIONS

Product Data Sheet from Coopers Creek Chemical Company on Protar 5000.
Product Data Sheet from Coopers Creek Chemical Company on Protar 2000.
Material Safety Data Sheet L00128 from Lion Oil Company on Lion Nokorode Seal Perm.
Material Safety Data Sheet L00124 from Lion Oil Company for Lion Nokorode K–Kote.
Material Safety Data Sheet L00144 from Lion Oil Company for Lion Nokorode 124A Emulsion.
Material Safety Data Sheet L00121 from Lion Oil Company for Lion Nokorode Low Temp Bedding Compound.

*Primary Examiner*—Henry F. Epstein
*Attorney, Agent, or Firm*—L. Rita Herzfeld

[57] ABSTRACT

A shaped article and method for making the article is disclosed. The method involves forming a raw material mixture of a thermosetting resin which can be either solid resin or liquid resin, hydrophilic filler, which can be carbonizable and/or inorganic, temporary organic binder, and optionally an effective amount of extrusion aids. The mixture is extruded into a shaped article, dried, and the resin is cured. The cured article can be further carbonized and activated. The activated carbon, especially a honeycomb is used for adsorbing components from a workstream.

29 Claims, 1 Drawing Sheet

EXTRUDED STRUCTURES FROM THERMOSETTING RESINS

This application is a continuation-in-part of application Ser. No. 08/395,224, filed Feb. 27, 1995, now abandoned.

This invention relates to making of activated carbon structures by extrusion of thermosetting resin-filler-binder mixtures. More particularly the structures are honeycombs.

BACKGROUND OF THE INVENTION

Activated carbon is utilized in many industrial applications for process stream purifications as well as pollution control in the form of packed beds of beads or powders.

Recently activated carbon honeycombs fabricated by various methods have been made to avoid high pressure drop associated with packed beds. The various methods devised to fabricate the honeycombs include extrusion of finely powdered activated carbon with organic or inorganic binders. Honeycombs fabricated by these processes are generally poor in durability and low in strength. The low strength results from inability of carbon to bond to any binder.

Another method of fabricating a honeycomb containing activated carbon involves coating extruded and fired inorganic porous honeycombs with synthetic resins which are then carbonized and activated as disclosed in U.S. Pat. No. 5,451,444, Sept. 19, 1995. These structures are strong, durable and have a controlled carbon structure. They are, however, too expensive for some applications.

Carbon derived from synthetic resin provides unique adsorption properties such as three to five times adsorption capacity compared to commercial activated carbon. For this reason it is advantageous to use resins as precursors in making activated carbon bodies.

Forming activated carbon structures from precursors such as resins has been disclosed in U.S. Pat. No. 5,510,063, Apr. 23, 1996 and U.S. application Ser. No. 08/228,265 filed Apr. 15, 1994, (now-abandoned). While these methods produce relatively simple shapes, high cell density honeycombs may be difficult to produce.

U.S. Pat. No. 4,399,052 discloses direct extrusion of honeycombs from resins followed by carbonization and activation to make activated carbon honeycombs. There are several problems associated with this process. The process involves mixing of solid phenolic resins (novolaks) and liquid phenolic resins (resoles), two thermoset resins, which react with each other during extrusion. The reaction causes foaming of the extruded structure and destroys the structure The mixture also becomes rubbery and is very difficult to extrude. Thus no useful honeycomb structures can be made using this process. The reasons given above clearly indicate that no process is available for making resin honeycombs from thermoset resins via extrusion. Another problem associated with this process is that during carbonization and activation, about 60–65% by weight of the resin is lost as low molecular weight compounds. Such a large weight loss associated with the process causes large shrinkages and such honeycombs are prone to severe distortions and cracking. This problem can be avoided to some extent by slow heat-up rates. The evolution of volatiles still remains a problem however, because for a given wall thickness of the honeycomb, it is difficult to remove the carbonization by-products from the interior of the honeycomb structure. The low molecular weight by-products build up inside the honeycomb walls and the structure explodes into many fragments.

Thus it would be a distinct advantage in the art to be able to fabricate durable and well-formed honeycomb shapes without cracking and distortion by an industrially useful manufacturing process.

The present invention provides such a process.

SUMMARY OF THE INVENTION

In accordance with one aspect of the invention, there is provided a method for making a shaped article. The method involves forming a raw material mixture of a thermosetting resin which can be either solid resin or liquid resin, hydrophilic filler, which can be carbonizable and/or inorganic, temporary organic binder, and optionally an effective amount of extrusion aids. The mixture is extruded into a shaped article, dried, and the resin is cured. The cured article can be further carbonized, and activated.

In accordance with another aspect of the invention, there is provided a shaped article made by the abovedescribed method.

In accordance with still another aspect of the invention, there is provided a method of removing one or more components from a workstream which involves passing the workstream through the above described activated carbon article in the shape of a honeycomb to adsorb the component (s).

DETAILED DESCRIPTION OF THE INVENTION

Figure 1:
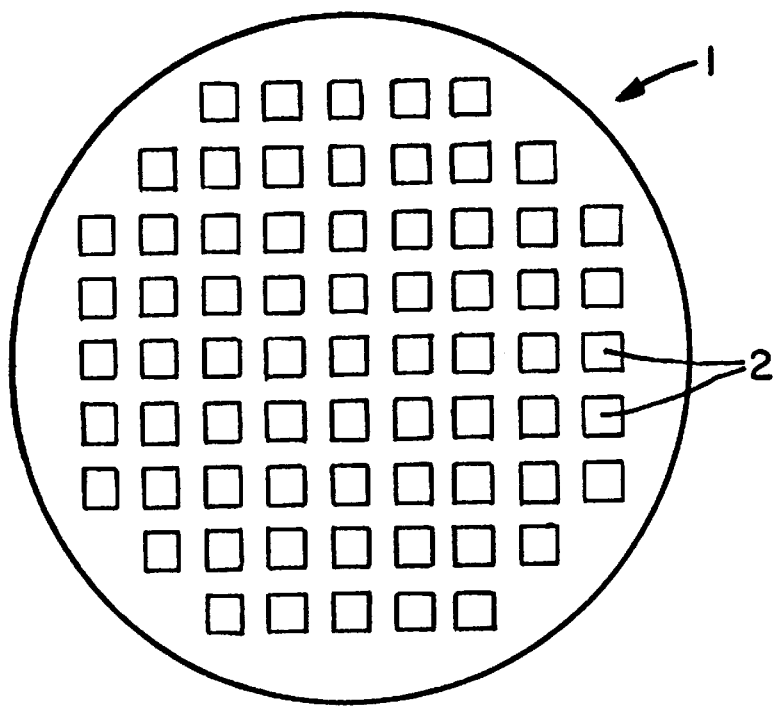
FIG. 1 is a schematic diagram of a cross section of honeycomb made by the method of the present invention.

The present invention provides a method of fabricating articles from thermosetting resin, which are free of cracks and distortion. The articles are flow-through monolithic structures or bodies, that is, they are suitable for passage of a fluid workstream therethrough. After curing and carbonization, activated carbon bodies can be produced with high adsorption capacity. The method is especially suited for making multicellular structures such as honeycombs. Such bodies have well-defined cell structure as exemplified by FIG. 1.

The structures of the present invention are suited for use in any of a wide variety of applications for which activated carbon bodies have been used in the past such as removal of selected components from a workstream by adsorption. Examples of some applications include residential water purification, volatile organic compound emission control, natural gas fuel storage for gas-powered vehicles or equipment, indoor air purification, industrial respirators, automotive cabin air filters, ventless hoods, chemical separations, $NO_x$, and $SO_x$, control, and exhaust traps for automotive cold start applications. Other potential applications include use as ozone filters, mercury collection from municipal incinerators, radon adsorption, automotive gas tank or intake manifold emissions, sewer pump vents, oil-air separations, or any other application wherein adsorption of a component or components from a fluid stream containing multiple components is desired. With honeycomb shapes, the workstream passes through the cells or channels of the honeycomb.

The resin honeycombs (before carbonization) can be useful in automotive and aerospace application where high stiffness to weight ratios or high strength to weight ratios are desirable.

The bodies are made by extrusion of a raw material mixture of the resin, temporary binder which does not chemically react with the thermoset resin, various fillers, and optionally extrusion aids to improve the extrudability of the mixture. Only one type of thermoset resin, that is, either liquid type or solid type is used in a given mixture.

The resin derived bodies of the present invention have advantages over bodies made from activated carbon, e.g. by extrusion of activated carbon. Bodies made directly from activated carbon are made of discontinuous carbon which must be bound together by permanent binders; whereas resin-derived activated carbon bodies e.g. honeycombs are made of continuous carbon and do not require permanent binders This continuous carbon structure is strong and durable and can be used in high flow rate adsorption processes. Such bodies also have durability in liquid streams. Bodies made from activated carbon particles are not durable in organic solvents and in many cases even in water, since the binder holding the structure together is water soluble. Another advantage is high adsorption capacity of the bodies derived from high carbon yielding resins.

The bodies of the present invention have an advantage over carbon coated ceramic bodies because there is no need to go through the expensive process of first fabricating a ceramic substrate which then has to be coated with resin precursor, which is then carbonized and activated. The use of a ceramic substrate makes such a product expensive and not economically viable for some applications Another disadvantage of carbon coated structures, e.g. honeycombs, is that the amount of resin picked up is limited by the amount of porosity in the substrate wall. This limits the amount of carbon available on the structure and so limits the adsorption capacity.

The bodies of the present invention which are made of one type of resin, either liquid or solid, but not both types, have an advantage over the bodies produced according to U.S. Pat. No. 4,399,052, which teaches use of both liquid and solid resins. For example, according to this invention, strong well formed bodies especially high cell density honeycombs can be extruded with no problems, and without the slow heating processes required in the process of U.S. Pat. No. 4,399,052.

The Resin

The most suitable thermosetting resins are phenol formaldehyde and furan resins because of their high carbon yield on carbonization, that is, at least about 10 wt.% and more typically at least about 50% based on the cured weight of the resin. Phenol formaldehyde can be used in liquid form (resole) or solid form (novolak). Furan can be used in liquid form.

Phenol formaldehyde resins are commercially available in liquid or solid form and are made by reaction of phenol and formaldehyde.

When the reaction is carried out between one mole or more of formaldehyde per mole of phenol under alkaline conditions, the reaction once started is capable of continuing to completion without further addition of material until the reaction mass has become insoluble and infusible These resins are referred to as single stage resins or resoles. In commercial practice, in most cases, the reaction is carried to a predetermined point and the resin is then cooled to retard the reaction. Most commercial products are aqueous liquids with various degrees of viscosity (e.g. 100–1000 cps). The resin is then further processed to various shapes, etc.

When the reaction between phenol and formaldehyde is carried out in acidic medium with one or more moles of formaldehyde per mole of phenol, the reaction rapidly goes to formation of an insoluble and infusible mass. In commercial practice the reaction is carried out in acidic medium by condensing one mole of phenol with less than 0.9 moles of formaldehyde. In this case, the reaction proceeds to the formation of a permanently fusible resin, which requires addition of some form of formaldehyde before it converts to the insoluble, infusible stage. This resin is called a two stage resin. The product of the first stage is called novolak. In order to cure novolaks some form of formaldehyde or formaldehyde donor must be added to bring the ratio of formaldehyde to phenol to the proper level for curing. Typically, hexamethylenetetramine ("hexa") is commonly used and is blended with resin in finely divided form. Under the influence of heat, the hexa breaks down into formaldehyde and ammonia and formaldehyde reacts with novolak causing it to cure. Many other curing agents other than hexa are described in the literature such as ethylenediamine-formaldehyde products, anhydroformaldehyde-aniline, and methylol derivatives of urea or melamine, paraformaldehyde, etc.

It is important to note that in the practice of this invention, liquid and solid resins are not to be mixed. Within a liquid resin system, a mixture of different liquid resins can be used e.g. a mixture of resole and liquid furan. Likewise within a solid resin system, a mixture of different solid resins can be used such as in commercial bulk molding compounds.

Figure 2:
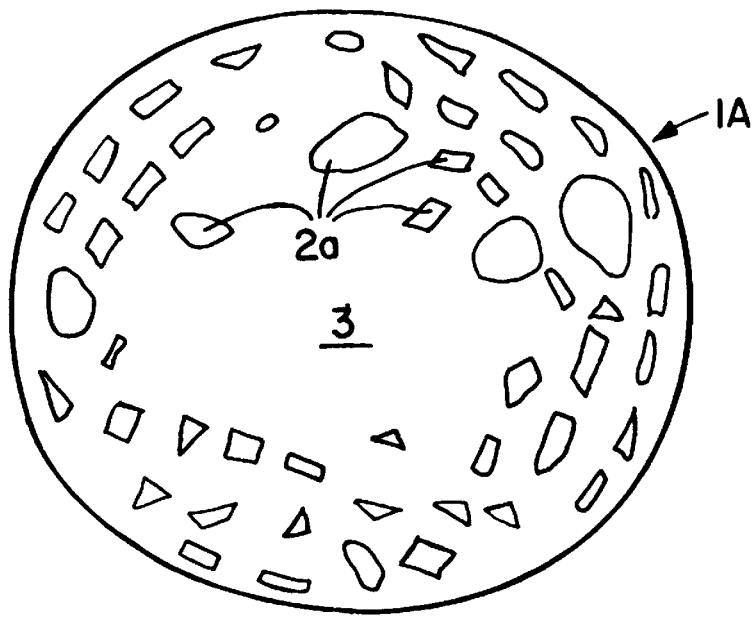
FIG. 2 is a schematic diagram of a cross section of a honeycomb made by a prior art method.

It has been found that when liquid resins and solid resins are mixed, and extrusion is attempted, severe reaction takes place in the extruder resulting in foaming of the extrudate and ceasing of the extruder. For example in a screw extruder, the screw does not move even at maximum power. Whatever does come out of the extruder, does not have the desired shape. For example when extrusion is attempted through a honeycomb die, there is no formation of honeycomb cells as is shown in FIG. 2. FIG. 2 is a schematic cross section of an extrudate of a mixture of solid and liquid resin.

When a liquid resin is chosen, the preferred resin is phenolic resole having a high viscosity (100–1000cps). One especially suited phenolic resole resin is available from Occidental Chemical Corporation, Niagara Falls, N.Y. under the product name of Plyophen 43290. Plyophen 43290 is a liquid one step phenolic resin containing phenol, formaldehyde, and water, having a specific gravity of 1.22–1.24, a boiling point >100° C. and a pH of 7.5–7.7 @ 100 gm/l. Another suitable phenolic resin is a product available from Borden Chemical Co. with the product name of Durite. This resin is chemically similar to Plyophen resin but has a viscosity of about 300 cps.

Furan resins are available as liquids. One furan that is suitable to the practice of the present invention is supplied by QO Chemicals, Inc. under the name of Furcarb® LP. Furcarb® LP resins are preparations of phenol (4% max) in furfuryl alcohol, and have a specific gravity of 1.2, and a boiling point of 170° C. The viscosity is 300 cps.

When solid resin is chosen, the preferred resin is phenolic novolak.

Phenolic molding compounds are available commercially. These molding compounds are solid and contain various mineral, organic and inorganic fillers usually at about 25 to 70 wt.%. Such commercial products may be used in the present invention. The solid compounds can be ground to a fine powder and the binder, extrusion aids, and additional fillers added and mixed in, and extruded. Depending on the compound and the content and type of filler already present, the level of filler and binder is adjusted to give the ranges of this invention. Molding compounds available from DUREZ Division of Occidental Chemical Co. such as general purpose compounds, medium impact compounds, glass-filled or heat-resistant electrical grades or compounds identified by numbers such as 32424, 32110, and 18420 can be used. Several molding compounds are available with wood flour, cotton or other type of organic fillers also and such compounds can also be used.

The Temporary Binder

A temporary or fugitive binder is used to bind the resin and fillers, and will be removed in the heat-treatments. With either type of resin, a plasticizing organic binder is most typically used. A plasticizing organic binder contributes to the plasticity of the mixture for shaping into a body. The plasticizing organic binder according to the present invention refers to cellulose ether binders. Some typical cellulose ethers are methylcellulose and its derivatives such as ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. This can include a mixture of different types of methylcellulose and/or different types of hydroxypropyl methylcellulose. Some sources of methylcellulose and/or its derivatives are Methocel A4M, F4M, and F40M from Dow Chemical Co.

The Extrusion Aids

Extrusion aids are included as optional additions to the raw material mixture in amounts sufficient to enhance the lubricity of the mixture for ease in passing through the extruder and die, especially in solid resin mixtures. The extrusion aids are the same for both types of resin mixtures. Some preferred extrusion aids are soaps, fatty acids such as oleic, linoleic acid, etc., polyoxyethylene stearate, etc. or combinations of these. Especially preferred is sodium stearate. Optimized amounts of extrusion aid(s) depend on the composition and binder, although generally extrusion aids make up no more than about 3%, by weight of the mixture.

The Filler Materials

For both liquid and solid resin systems, the filler must be hydrophilic in order to be easily wet by the liquids in the system. The fillers are most typically an oxygen-containing, e.g. oxide substance, and are therefore relatively inexpensive. Generally, with both liquid and solid resins, the fillers can be carbonizable and/or inorganic.

The fillers can be fibrous. Fibrous fillers typically give higher strength and stiffness to a structure compared a particulate structure. According to this invention, by fibrous is meant a length of up to about 1 centimeter, and preferably up to about 500 micrometers. The diameter is up to about 500 micrometers, preferably up to about 100 micrometers, and most preferably up to about 10 micrometers.

Although both carbonizable and inorganic fillers can be used with both types of resins, choice of specific types of fillers will offer certain advantages depending on whether the resin is liquid or solid.

Using either liquid or solid resin alone presented certain problems that had to be solved.

For example, liquid resin has a very low viscosity and requires some type of filler to be extrudable. Elemental carbon fillers may be used to form an extrudable batch but on carbonization such structures have poor strength since the carbon filler does not bond to the resin.

For liquid resin systems, it was found that addition of a hydrophilic carbonizable (essentially organic) filler, with or without a hydrophobic organic filler, (preferably fibrous), is necessary to form a good honeycomb extrusion. Hydrophilic organic fibrous filler allows the liquid resin to infiltrate the fibrous structure at high loading levels. The mixture has good rigidity and is extruded into a honeycomb shape easily and maintains the shape on carbonization. Inorganic hydrophilic fillers preferably with a fibrous morphology can also be used with liquid resins in addition to the carbonizable filler. Mixtures of organic and inorganic fillers result in optimized strength and rigidity of the final carbon product, as well as minimization of cost. Inorganic fillers also minimize shrinkage and warpage.

Both natural and synthetic carbonizable fillers can be used. Some natural materials are soft woods, e.g. pine, spruce, redwood, etc., hardwoods e.g. ash, beech, birch, maple, oak, etc., sawdust, shell fibers e.g. ground almond shell, coconut shell, apricot pit shell, peanut shell, pecan shell, walnut shell, etc., cotton fibers e.g. cotton flock, cotton fabric, cellulose fibers, cotton seed fiber, chopped vegetable fibers for example, hemp, coconut fiber, jute, sisal, and other materials such as corn cobs, citrus pulp (dried), soybean meal, peat moss, wheat straw, wool fibers, corn, potato, rice, and tapioca etc. Some synthetic materials are regenerated cellulose, rayon fabric, cellophane, etc.

Some examples of carbonizable fillers that are especially suited for liquid resins are cellulose, cotton, wood, and sisal, or combinations of these, all of which are preferably in the form of fibers.

One especially suited carbonizable fiber filler is cellulose fiber as supplied by International Filler Corporation, North Tonowanda, N.Y. This material has the following sieve analysis: 1–2 % on 40 mesh (420 micrometers), 90–95% thru 100 mesh (149 micrometers), and 55–60%, thru 200 mesh (74 micrometer).

Some inorganic fillers that can be used are oxygen containing minerals such as clays, zeolites, talc, etc., carbonates, such as calcium carbonate, aluminosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibers, cordierite powder, sand (silica), vermiculite, etc.

Some examples of especially suited inorganic fillers are cordierite powder, talcs, clays, and aluminosilicate fibers such as provided by Carborundum Co. Niagara Falls, N.Y. under the name of Fiberfax, and combinations of these. Fiberfax aluminosilicate fibers measure about 2–6 micrometers in diameter and about 20–50 micrometers in length.

Hydrophobic organic fillers provide additional support to the shaped structure and introduce wall porosity on carbonization because in general they leave very little carbon residue. Some hydrophobic organic fillers are polyacrylonitrile fibers, polyester fibers (flock), nylon fibers, polypropylene fibers (flock) or powder, acrylic fibers or powder, aramid fibers, polyvinyl alcohol, etc.

In general the particle or fiber size of the fillers must be such that they will be able to pass through the respective die in forming thin walled structures such as honeycombs. For examples for extrusion of a 0.15 mm (6 mil) wall honeycomb through a die that has 152 micrometer openings, up to about 420 micrometer long cellulose fibers have been found to work well. This example is merely illustrative and it is to be understood that the invention is not limited to specific size fillers for specific size structures.

For both solid and liquid resins, the filler makes up about 10% to 85 wt.% of the mixture (excluding any water that is added). The weight ratio of filler to resin is generally about 0.2 to 4.0.

One liquid resin mixture that is suitable for the present invention consists essentially of in percent by weight about 2% to 50% cellulose fibers, about 4% to 10% organic binder which is typically methylcellulose, and/or methylcellulose derivatives, 0% to about 15% hydrophobic organic filler such as polyester flock, polypropylene flock or powder, acrylic fibers or powders, etc, 0% to about 2% lubricant, e.g. soap, and the balance being phenolic resole.

More advantageously, the liquid resin mixture consists essentially of in percent by weight about 20% to 35% cellulose fibers, about 4% to 10% and more typically about 3% to 7% organic binder which can be methylcellulose, and/or its derivatives, 0% to about 2.0% lubricant, e.g., soap, and the balance being phenolic resole.

The above compositions can include additionally about 5% to 60% and more advantageously about 10% to 30% cordierite powder filler.

Another useful liquid resin mixture consists essentially of in percent by weight about 2% to 50% cellulose fibers, about 30% to 45% inorganic filler which can be any one or combination of cordierite powder, clay, and talc, about 4% to 10% organic binder which can be methylcellulose, and/or its derivatives, 0% to about 2% lubricant, e.g. soap, and the balance being phenolic resole.

More advantageously the composition consists essentially of in percent by weight about 9% to 25%, and most typically about 10% to 15% cellulose fibers, about 30% to 45% inorganic filler which can be clay, e.g. hydrite clay, talc, or cordierite powder, or combinations of these, about 4% to 10% organic binder which can be methylcellulose, and/or its derivatives, about 0% to 2.0%, e.g. soap, and the balance being phenolic resole.

Such compositions are advantageous for liquid resin systems because the carbonizable hydrophilic materials such as cellulose fibers soak in the liquid resin and form a stiff batch which can be extruded. Additionally on carbonization, they yield carbon which results in additional adsorption capacity. The inorganic filler reduces shrinkage on carbonization and imparts strength and stiffness and reduces batch cost.

Solid phenolic resin (novolak) is solid at room temperature, but melts at about 60°–75° C. The cure temperature is, however about 150° C. As the extruded product is heated to cure the resin at about 150° C., the structure collapses at about 75° C.

For solid systems, the filler stiffens the structure during the softening of the resin before cure. The filler can be either a carbonizable or an inorganic material. A combination of inorganic and carbonizable material is preferred. Hydrophobic organic fillers are also desirable in solid resin mixtures. The advantages of carbonizable and hydrophobic organic fillers have been previously discussed. The preferred solid resin is novolak.

The carbonizable and inorganic fillers are the same as described above for liquid resins. For solid resins, fibrous inorganic fillers are especially useful.

One useful solid resin mixture composition consists essentially of in percent by weight about 2% to 50% cellulose fiber, about 5% to 50% inorganic filler which can be cordierite powder, talc, or combinations of these, about 5% to 10% organic binder which can be methylcellulose, and/or its derivatives, 0% to about 15% hydrophobic organic filler such as polyester flock, polypropylene flock or powder, acrylic fibers or powders, etc, 0% to about 2% lubricant, e.g. soap, and the balance being novolak. More advantageously, the solid resin mixture composition consists essentially of in percent by weight about 8% to 22%, and more typically about 8% to 12% cellulose fiber, about 15% to 30% inorganic filler which can be cordierite powder and/or talc, about 5% to 10% organic binder which can be methylcellulose and/or its derivatives, 0% to 3%, and more typically about 0.5% to about 2% lubricant, e.g. soap, and the balance being novolak.

Another useful solid resin mixture composition consists essentially of in percent by weight about 5% to 50% aluminosilicate fiber, about 5% to 50% carbonizable filler, about 4% to 10% organic binder which can be methylcellulose, and/or its derivatives, about 1% to about 3% lubricant, and the balance being novolak.

More advantageously the mixture composition consists essentially of in percent by weight about 8% to 15% aluminosilicate fiber, about 5% to 20% hydrophobic organic filler, e.g. polyester flock, about 4% to 10% organic binder which can be methylcellulose and/or its derivatives, about 1% to about 3% lubricant, e.g. soap, and the balance being novolak.

In any of the above-described compositions, up to about 70% by weight of the resin content in the raw material mixture can be replaced by petroleum pitch and/or coal tar pitch as a more economical carbon source. Some petroleum and coal tar pitch products that can be used, although it is to be understood that these are illustrative and the invention is not limited to such, are discussed below.

Examples of petroleum pitch products are petroleum hydrocarbons and petroleum hydrocarbon emulsions are among others, Seal perm, 124A, low temperature compound pitch product, and K-Kote, all supplied by Lion Oil Co., El Dorado, Ark. According to Material Safety Data Sheet L00128, (page 1) from Lion Oil Co., Seal perm petroleum pitch, also designated as Petroleum Asphalt Mastic, contains about 46 wt.% asphalt and about 31 wt.% 300/360 B.R. Naphtha. According to Material Safety Data Sheet L00144, (page 1) from Lion Oil Co., petroleum pitch 124A is an emulsion containing <50 wt.%) petroleum asphalt, <5% fillers, <55% water, <10 % tall oil, and <0.1% potassium bichromate. According to Material Safety Data Sheet L00121, (page I) from Lion Oil Co., low temperature compound pitch product contains about 31 wt.% asphalt, about 25 wt.% 300/360 B.R. Naphtha, and about 5 wt.% 200 Pale Oil. According to Material Safety Data Sheet L00124, (page 1) from Lion Oil Co., K-Kote contains about 43.0 wt.% asphalt, and about 39.0 wt.% 300–360 B.R. Naphtha.

Examples of typical coal tar pitch products are, among others, those from Coopers Creek Chemical Corporation, West Conshohocken, Pa., under the names of Protar 2000 and Protar 5000. According to product data sheets from Coopers Chemical Creek Corporation, these products are refined coal tars produced from selected high temperature coke oven tars. Protar 2000 is described as having a viscosity of 1000–2500 cps, a maximum water content of 0.5 vol.%, a specific gravity at 77° F. of 1.12–1.20, and a flash point of (Pensky Martins) of 205° F. Protar 5000 is described as having a viscosity of 4000–6000 cps, a maximum water content of 0.5 vol. %, a specific gravity at 77° F. of 1.14–1.24, and a flash point (Pensky Martins) of 180° F.

The mixture components are blended. Most typically dry components are blended after which they are blended with the liquid components in a muller. Water is added if necessary to make the mixture handleable for extrusion. The mixture is then extruded. Conventional extrusion equipment can be used. For example, the extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The mixture can be extruded into any convenient shape or size. The preferred shape is a honeycomb structure. Honeycombs can have typically about 3.8–94 cells/cm$^2$ (about 25–600 cells/in$^2$) and wall (web) thicknesses of about 0.15 to 1.3 mm (about 6–50 mils).

The present invention has been found to be especially useful in producing honeycombs having about 15.5 cells/cm$^2$ (about 100 cells/in$^2$) with wall thicknesses of about 0.5 mm (about 20 mils), about 31 cells/cm2 (about 200 cells/in2 and wall thicknesses of 0.3mm (about 12 mils) or 0.5 mm (about 20 mils), and about 62 cells/cm$^2$ (about 400 cells/in$^2$) with wall thicknesses of about 0.15 mm (about 6 mils), or about 0.3 mm (about 12 mils). The external size and shape of the body is controlled by the application.

The shaped bodies are then dried. Drying can be done in air at room temperature—80° C., or in dielectric or microwave dryers. As can be seen, the drying times are much shorter than those described in U.S. Pat. No. 4,399,052. Without wishing to be bound by theory, it is believed that the fillers provide adequate pathways for escape of gases during the heating, thus preventing build up of by-products in the body. The method of this invention does not require very slow heat-up that is required in the '052 patent.

The dried bodies are then cured in the shaped form by heating under the specific temperature and time conditions required for the specific resin. The curing can be done in a conventional oven. Standard curing conditions can be found in the manufacturer's literature. For example, for phenolic resole 43290 from Occidental Chemical Co. the body is heated in air to about 140°–155° C. The final temperature is attained slowly so that the body does not distort. For example, the body is first heated to about 90° C.–100° C., then to about 120° C.–130° C. and held at this temperature for about 1–2 hours. It is then heated to about 140° C.–155° C. and held For about 30 minutes—2 hours for final cure. Curing can also be done in a dielectric or microwave oven.

The dried and cured bodies are self supporting shapes and can be used in applications as is.

It is preferred to carbonize the cured bodies. The carbonization is carried out by heating the body in an inert or reducing atmosphere such as nitrogen or argon or forming gas. Forming gas is a mixture of nitrogen and hydrogen. Typical mixtures by volume are 92:8 or 94:6 $N_2:H_2$, although any mixtures can be used. Carbonization temperatures are about 600° C.–1000° C. or more typically about 700°–1000° C. for a length of time of usually about 1–20 hours. While the body is in the temperature range of about 300°–600° C., the fugitive materials vaporize. During carbonization low molecular weight compounds separate out and carbon atoms form graphitic structures. For example for phenolic resole resin 43290 from Occidental Chemical Co. and Furan Furcarb resin from QO Chemicals, carbonization is done by heating at a rate of about 150° C./hr in $N_2$. The temperature is held at about 900° C. for about 6–10 hours to complete the carbonization. The temperature is then reduced to 25° C. at a cooling rate of about 150° C./hr. On carbonization, the body contains random three dimensional oriented graphitic platelets with amorphous carbon between the platelets.

It is preferred to activate the carbon bodies to produce activated carbon bodies. This is done by partially oxidizing in a suitable oxidant such as $CO_2$, steam, air, or a combination of these, etc. Activation can be carried out at temperatures between about 700 ° C.–1000° C. Activation conditions depend on type and amount of resin, flow rate of gas, etc. For example for phenolic resole and Furcab resins activation conditions are at about 900° C. for about 1 hour in $CO_2$ at a flow rate of about 14.2 1/hr. (about 0.5 CFH (ft.$^3$/hr.)). The partial oxidation during activation causes the removal of the amorphous carbon and the formation of molecular size porosity between the graphitic platelets. This porosity and the graphitic platelets impart the adsorption characteristics to the resulting activated carbon body. Such activated carbon bodies are used in adsorption applications.

To more fully illustrate the invention, the following non-limiting examples are presented. All parts, portions, and percentages are on a weight basis unless otherwise stated.

Comparative Examples

The first four examples show the problems associated with the prior art practice of using a combination of liquid and solid resins. In all these cases, severe reaction between the two resins took place during extrusion causing foaming and binding of the extruder. The small amount of product that could be obtained before the extrusion had to be discontinued had very poor (cracked) skin with blocked honeycomb cells. The extrusion had to be stopped in all cases because of noxious fumes and binding of the extruder.

Example 1

About 36% liquid phenolic resin (resole) from Occidental Chemical Co., about 28% solid phenolic resin (novolak) from Occidental Chemical Co., and about 27% ground cordierite powder as filler and about 9% methylcellulose were mixed with water and the mixture was extruded through a 25 ton extrusion press. High extrusion pressures of about 14.5 MPa (about 2100 psi) were required to extrude the batch. As soon as the extrusion started, however, foaming was evident with noxious fumes being emitted. The extruder bound up and stopped working. A very poor small sample was obtained before the extrusion stopped. The sample foamed and a honeycomb structure did not form. FIG. 2 shows a cross section of a typical product of this extrusion (1A). As can be seen, there are no distinct honeycomb cells. There are irregular openings (2a) which may or may not be open from one end of the structure to the other. The area designated by (3) is a solid mass.

Example 2

About 63% solid phenolic resin, about 5% liquid phenolic resin of the same types as in Example 1, about 13% ground cordierite filler, about 6% polyester flock, and about 13% methylcellulose were mixed with water. Extrusion into honeycomb shapes was attempted. Again the two resins reacted severely and foamed. The extrusion could not be carried out.

Example 3

About 19% solid phenolic and about 33% liquid phenolic resin as in Example 1, about 40% ground cordierite powder, and about 8% methylcellulose were mixed with water and extrusion was attempted. The resins reacted and the extrusion had to be discontinued.

Example 4

About 7% solid phenolic resin, about 33% liquid phenolic resin as in Example 1, about 55% cordierite filler, and about 5% methylcellulose were mixed with water and extrusion attempted. The experiment had to be discontinued because of foaming and noxious fumes.

Inventive Examples

Butane adsorption capacity was measured on some of the inventive examples. Butane adsorption capacity was measured by placing test samples in a Vycor® tube housed inside a tube furnace having inlet and outlet ports. A 1500 volume ppm butane gas stream in a nitrogen carrier gas was introduced to the sample at a flow rate of about 4,000 cc/min. and adsorption was measured by monitoring the exit gas stream with a flame ionization detector. Adsorption at room temperature was considered complete when the calibrated detector reading had reached about 95%. The detector readings were plotted versus time and the adsorption was measured by integrating the area under each curve. The values reported for adsorption are the total milligrams of butane adsorbed for a 2.54 cm (1") diameter, 2.54 cm (1") long sample.

The following examples show how honeycombs can be extruded from liquid phenolic resin.

Example 5

Liquid phenolic resole of the type used in Example 1 at about 65% was mixed with about 29% cellulose fiber from International Filler Corporation, North Tonowanda, N.Y., about 5.0% methylcellulose, and about 1% soap as a lubricant. The mixture was extruded into excellent stiff honeycombs with about 31 cells/cm$^2$ (200 cells/in$^2$). The extrusion pressure was about 6.89 MPa (about 1000 psi). The samples were exposed to about 80,° C. for drying and then cured at about 150° C. for about 30 minutes. The honeycombs were strong with well defined cell structure. The honeycombs were carbonized at about 900° C. for about 5 hours and activated at about 800° C. for about 1 hours in carbon dioxide. The resulting structures were strong activated carbon honeycombs. Butane adsorption capacity was about 578 mg. FIG. 1 is a schematic diagram of a cross section of a honeycomb (1) made according to this example. As can be seen, the structure is well formed with distinct cells which are shown as (2).

Example 6

Durite liquid phenolic resin (resole) from Borden Inc. chemically identical to the resin of Example 1 at about 40%, about 13% cellulose fiber, about 40% ground cordierite filler, about 6% methylcellulose, and about 1.% soap lubricant were mixed with water and extruded into honeycomb shapes. The extrusion pressure was about 6.6 MPa (about 900 psi). These honeycombs were then cured, carbonized at about 900° C. for about 5 hours, and activated at about 900° C. for about 1 hour to obtain a strong activated carbon honeycombs with well-defined cells. The butane adsorption capacity was 403 mg.

Example 7

About 33%, liquid phenolic resin of the same type as in Example 6, about 50% cordierite filler, about 8% methylcellulose, about 8% cellulose fiber, and about 1% soap were mixed with water and extruded into honeycomb shapes. The extrusion pressure was about 7.58 MPa (about 1100 psi). Excellent samples were obtained, which were dried, cured, and carbonized and activated to obtain strong honeycombs with butane adsorption capacity of about 213 mg Example 8

About 40% liquid phenolic resin of the same type as in Example 6, about 40% cordierite filler, about 12% cellulose fiber, and about 8% methylcellulose were mixed with water and extruded, cured, carbonized and activated into strong activated carbon honeycombs which had a butane adsorption capacity of about 400 mg. The extrusion pressure was about 7.58 MPa (about 1100 psi).

Example 9

About 62.3% phenolic resin of the type of Example 6, about 27.5% cellulose fiber, about 4.7% polyester flock, about 4.6% methylcellulose, and about 0.9% soap were mixed with water and extruded into a honeycomb having about 62 cells/cm$^2$ (400 cells/in$^2$). The honeycomb was cured, carbonized, and activated. The butane adsorption capacity of this honeycomb was about 402 mg.

Example 10

About 40% cordierite filler, about 12% cellulose fiber, about 8% methylcellulose, about 0.9% soap, about 0.5% oleic acid and the balance liquid phenolic resin of the same type as in Example 6 were mixed with water and extruded into a honeycomb structures. Excellent honeycomb structures were produced.

The following examples show how honeycombs can be extruded from solid phenolic resin.

Example 11

About 67, solid phenolic resin as in Example 1, about 13% Fiberfax fiber from Carborundum Corporation, Niagara Falls, N.Y., about 7% methylcellulose, about 13% polyester flock from International Filler, North Tonowanda, N.Y. were mixed with water and extruded into honeycomb shape at about 3.70 MPa (about 550 psi) extrusion pressure. The honeycombs were then cured, carbonized, and activated to obtain activated carbon honeycombs with a butane adsorption capacity of about 347 mg.

Example 12

About 9.39%, cellulose fiber, about 27.8% talc, about 6.59% methylcellulose, about 0.9% soap, and the balance solid phenolic resin of the type as in Example 11 were mixed with water and extruded into a honeycomb structure. The structure was cured, carbonized, and activated. The butane adsorption capacity of the honeycomb was about 601 mg.

Example 13

About 10.2% cellulose fiber, 20.4% cordierite, about 7.1% methylcellulose, about 1% soap, and the balance solid phenolic resin of the type as in Example 11 were mixed with sufficient water to make an extrudable batch, and extruded, dried, cured, carbonized, and activated. The butane adsorption capacity of the honeycomb was about 740 mg.

Example 14

A phenolic molding compound from Occidental Chemical Co., Niagara Fall, N.Y. product code No. 32424 in the form of coarse granules with about 30–70% mineral fillers, was ground to −100 mesh powder. About 80% of this powder was mixed with about 11% cellulose fiber, about 8% methylcellulose, and about 1% soap, and sufficient water to make an extrudable batch. The mixture was extruded to obtain an excellent stiff honeycomb structure with about 31 cells/cm$^2$ (200 cells/in$^2$) The honeycomb was cured, carbonized, and activated to obtain an activated carbon structure.

The following examples show that liquid resins can be extruded with hydrophilic inorganic fillers without carbonizable hydrophilic organic fillers.

Example 15

About 62.9% talc, about 30.4% Durite liquid resin from Borden Chemical Co., about 4.7% of a Methocel® binder, and about 1% sodium stearate were mixed in a muller and then extruded into a honeycomb shape. The honeycomb structure was cured at about 150° C. and then carbonized at about 900° C. in nitrogen, and activated at about 925° C. in carbon dioxide to obtain a strong and adsorbent honeycomb.

Example 16

About 70.8% hydrite clay, about 17.7% Durite resin, about 7.1% of a Methocel® binder, about 1% sodium stearate, about 3.5% polyester flock, and about 19.59% water were mixed, extruded into a honeycomb, cured, carbonized, and activated as described above, to obtain a strong activated honeycomb structure.

Example 17

About 47% finely ground vermiculite (−200 mesh) (hydrophilic mineral) powder, about 31.3% Durite liquid resin, about 6.3% Methocel® binder, about 0.8% sodium stearate, about 3.5% polyester flock, and about 13% water were mixed, extruded, and the resulting honeycomb was then cured, carbonized, and activated as described above, to obtain an adsorbent carbon honeycomb structure.

The following examples illustrate that part of the resin can be replaced by petroleum pitch or coal tar pitch to produce excellent quality honeycombs that can be used for adsorption applications.

Example 18

About 34% Durite liquid phenolic resin, about 22.6% Seal perm petroleum pitch, about 22.6% hardwood flour from American Wood Fibers, Wis., about 15.1% cordierite powder from Corning, Inc., about 4.7 Methocel® binder, about 1% sodium stearate were mixed in a muller with the necessary amount of water and extruded into honeycombs having 62 cells/cm.$^2$ (400 cells/in.$^2$) and 0.3 mm (12 mil) cell wall thickness. Excellent extruded structures were obtained which were then cured at about 150° C., carbonized at about 900° C. in nitrogen, and activated in carbon dioxide at about 900° C. to obtain activated carbon structures from resin pitch mixtures.

Example 19

The procedure of Example 18 was repeated with 124A petroleum pitch product from Lion Oil Co. as the pitch component, to obtain an excellent activated carbon honeycomb product.

Example 20

The procedure of Example 18 was repeated with Low temp. compound pitch product from Lion Oil Co. as the pitch component, again with excellent structures.

Example 21

About 28.3% Durite liquid resin, about 28.3% of a coal tar product from Coopers Creek Chemical Co., Protar 5000, about 22.6% wood flour from American Wood fibers, about 15.1% cordierite, about 4.7%o Methocel® binder, about 0.9% sodium stearate, and adequate water were mixed in a muller and then extruded into a honeycomb structure as described in Example 18. This excellent honeycomb structure was cured, carbonized, and activated as described in Example 18 to obtain an adsorbent activated carbon honeycomb.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of making a shaped article, the method comprising:
   a) forming a raw material mixture comprising
      a thermosetting resin selected from the group consisting of liquid resin, and solid resin,
      hydrophilic filler comprising material selected from the group consisting of carbonizable material, inorganic material, and combinations thereof,
      temporary organic binder, and
      0 to an effective amount of extrusion aids;
   b) extruding the raw material mixture into a shaped flow-through article;
   c) drying the shaped article;
   d) curing the resin,
   e) carbonizing the cured resin, and
   f) activating the carbon to form an activated carbon shaped article.

2. A method of claim 1 wherein the raw material is extruded into a honeycomb structure.

3. A method for removing one or more components from a work stream, the method comprising passing the workstream through the activated carbon honeycomb structure of claim 2 to cause adsorption of said one or more components by the activated carbon.

4. An article made by the method of claim 2.

5. A method of claim 1 wherein the filler content in the mixture is about 10% to 85% by weight.

6. A method of claim 1 wherein the weight ratio of filler to resin in the mixture is about 0.2 to 4.0.

7. A method of claim 1 wherein the resin is liquid resin.

8. A method of claim 7 wherein when the filler comprises carbonizable material.

9. A method of claim 7 wherein the filler comprises fibrous material.

10. A method of claim 9 wherein the filler is selected from the group consisting of cellulose fibers, cotton fibers, wood fibers, sisal fibers, and combinations thereof.

11. A method of claim 7 wherein the raw material mixture contains carbonizable and inorganic filler.

12. A method of claim 11 wherein the inorganic filler is selected from the group consisting of cordierite, clays, talcs, aluminosilicate fibers, mineral fillers, and combinations thereof.

13. A method of claim 7 wherein the raw material mixture additionally contains hydrophobic organic filler.

14. A method of claim 7 wherein the resin is phenolic resole.

15. A method of claim 14 wherein the raw material mixture consists essentially of in percent by weight about 2% to 50% cellulose fibers, about 4% to 10% organic binder selected from the group consisting of methylcellulose, methylcellulose derivatives, and combinations thereof, 0 to about 15% hydrophobic organic filler, about 0% to about 2% lubricant, and the balance being phenolic resole.

16. A method of claim 15 wherein the composition includes additionally about 5% to 60% cordierite powder.

17. A method of claim 14 wherein the raw material mixture consists essentially of in percent by weight about 2% to 50% cellulose fibers, about 30% to 45% inorganic filler selected from the group consisting of cordierite powder, clay, talc, and combinations thereof, about 4% to 10% organic binder selected from the group consisting of methylcellulose, methylcellulose derivatives, and combinations thereof, about 0% to about 2% lubricant, and the balance being phenolic resole.

18. A method of claim 1 wherein the resin is solid resin.

19. A method of claim 18 wherein the filler comprises carbonizable material.

20. A method of claim 19 wherein the carbonizable filler is selected from the group consisting of cellulose fibers, cotton fibers, wood fibers, sisal fibers, and combinations thereof.

21. A method of claim 18 wherein the filler comprises inorganic material.

22. A method of claim 21 wherein the inorganic filler is selected from the group consisting of cordierite, clays, talcs, aluminosilicate fibers, and combinations thereof.

23. A method of claim 18 wherein the filler comprises both carbonizable and inorganic materials.

24. A method of claim 18 wherein the solid resin is novolak.

25. A method of claim 24 wherein the composition consists essentially of in percent by weight about 2% to 50% cellulose fiber, about 5% to 50% inorganic filler selected from the group consisting of cordierite powder, talc, and combinations thereof, about 5% to 10% organic binder selected from the group consisting of methylcellulose, methylcellulose derivatives, and combinations thereof, 0 to about 15% hydrophobic organic filler, 0% to about 2% lubricant, and the balance being novolak.

26. A method of claim 24 wherein the composition consists essentially of in percent by weight about 5% to 50% aluminosilicate fiber, about 5% to 50% carbonizable filler, about 4% to 10% organic binder selected from the group consisting of methylcellulose, methylcellulose derivatives, and combinations thereof, about 1% to about 3% lubricant, and the balance being novolak.

27. A method of claim 18 wherein the solid resin is a molding compound.

28. A method of claim 1 wherein up to about 70% by weight of the resin content in the raw material mixture is replaced by a carbon precursor which is selected from the group consisting of petroleum pitch, coal tar pitch, and combinations thereof.

29. An article made by the method of claim 1.

* * * * *